United States Patent [19]

Régès

[11] Patent Number: 4,496,597

[45] Date of Patent: Jan. 29, 1985

[54] PROCESS FOR DRYING AND/OR PRESERVING FRUITS HAVING A HIGH SUGAR CONTENT

[76] Inventor: Bruno Régès, "Cante-Lausette" Pinel Hauterive, 47380 Monclar d'Agenais, France

[21] Appl. No.: 346,540

[22] Filed: Feb. 8, 1982

[51] Int. Cl.³ .............................. A23B 7/00; A23B 7/02
[52] U.S. Cl. ..................................... 426/402; 426/400; 426/401; 426/407; 426/615; 426/640; 426/465
[58] Field of Search .............. 426/640, 400, 402, 465, 426/407, 615, 401, 399, 403, 404, 325

[56] References Cited

U.S. PATENT DOCUMENTS

| | | | |
|---|---|---|---|
| 830,407 | 9/1906 | Bowers | 426/402 |
| 1,356,614 | 10/1920 | Fleming | 426/402 |
| 1,380,489 | 6/1921 | McLaughlin | 426/402 |
| 1,683,068 | 9/1928 | Forrest | 426/407 |
| 1,976,961 | 10/1934 | Pape | 426/402 |
| 2,115,382 | 4/1938 | Campbell et al. | 426/639 |
| 2,143,903 | 1/1939 | Wilbur | 426/402 |
| 2,411,896 | 12/1946 | Richmond et al. | 426/402 |
| 2,548,284 | 4/1951 | Battaglia | 426/407 |
| 2,897,088 | 7/1959 | Bozzo | 426/325 |
| 4,156,741 | 5/1979 | Beauuais et al. | 426/402 |

FOREIGN PATENT DOCUMENTS 441264  1/1936  United Kingdom ................ 426/407

OTHER PUBLICATIONS

J. Sci. Fd. Agric. 1973, vol. 24, p. 905.
Applied Microbiology 12/68, p. 1853, vol. 16/#12.
Elements of Food Technology 1977 Desrosier, Avi Publ. p. 302.
Food Dehydration 2nd vol. 2 Van Arsdel, Avi Publ. 1973, p. 185.
Commercial Fruit Processing, Woodroof et al., Avi Publ. 1975, p. 253.

*Primary Examiner*—Steven Weinstein
*Attorney, Agent, or Firm*—Oblon, Fisher, Spivak, McClelland & Maier

[57] ABSTRACT

A process for drying and/or preserving fruit, comprising:
  dehydrating fruit at a temperature of 55° to 80° C. for a period of about 16 hours until the water content of the fruit is about 40%;
  packing the so-dehydrated fruit into sterile containers, so as to minimize the amount of air in said containers, and hermetically sealing said containers;
  maintaining the hermetically sealed containers at a temperature of 75° to 80° C. for three to four hours; and then storing the containers at room temperature.

5 Claims, No Drawings

PROCESS FOR DRYING AND/OR PRESERVING FRUITS HAVING A HIGH SUGAR CONTENT

BACKGROUND OF THE INVENTION

1. Field of the Invention

This invention relates to a process for drying fruit and/or preserving dried or other fruits that are rich in sugar, such as the d'Agen prune.

The purpose of this invention is to provide a process that avoids the phenomenon known as "efflorescence of prunes" or sugaring.

2. Description of the Prior Art

This phenomenon, which can be observed as an irregular and superficial powdering, especially during storage and preservation of prunes after the drying process, seems to result from a change in the metabolism of the sugars present in the fruit, mainfesting itself in the following sequence linked to the enzymatic action:

1. superficial crystallization,
2. a change in the color of the sugars crystallized on the surface,
3. finally, alcoholic fermentation.

Since this invention is particularly, though not exclusively, aimed at the processing of prunes, a brief review of the conventional procedure for drying and storing prunes is first presented.

The dessication of prunes takes place in continuous-drying tunnels under controlled temperature, atmospheric humidity, and ventilation.

After this process, which is performed at a temperature in the range of 55° to 80° C., depending on the type of tunnel used and the "cooking" stage of the fruit, and lasts an average of 24 hours, the prunes are sized and stored for fairly long periods before conditioning.

The prune being very hygroscopic, the level of humidity is most important; so too, is storage in an environment that is as isothermal as possible and protected from light.

Moreover, to assure good preservation, it is important that the water content of the prune does not exceed 23 percent.

The conditioning, consists of giving a gloss and tenderness to the prunes while assuring that they are perfectly preserved. To achieve this, rapid and direct rehydration is performed, either by steam or by soaking in water at 75° to 80° C. for a time varying from 5 to 20 minutes. Thus, prunes are obtained that are ready to eat as such or to be cooked, having a water content between 29 and at most 35%, in accordance with prevailing law.

Preservation is assured either by sterilization, after packaging, or by adding a very small quantity of sorbic acid in the rehydration bath, before packaging. The packaging can take many forms, such as cardboard boxes, plastic bags, wooden crates, metal boxes, glass jars, etc.

DETAILED DESCRIPTION OF THE PREFERRED EMBODIMENTS

Following studies and research by the Applicant on the origin of the phenomenon of sugaring or efflorescence, it appears that this phenomenon comes about from the conjunction of a certain number of factors concerning the environment of the prune and the state of the prune after the drying procedure mentioned above.

Sugaring is usually observed between the months of February and April. This period generally brings a warming of the atmosphere and a saturation of the ambient air with water vapor, these two events manifesting themselves in wide variations in atmospheric pressure. One observes an increase in water content related to the hygroscopic properties of the prune.

The Applicant has also observed the resumption during this period of the activity of microorganisms, especially yeasts.

This particular phenomenon is part of a more general "working" phenomenon in all substances rich in sugars. It comes about at the moment of the florogenesis of the plant of origin, as can be observed in bottled wine which "works" during blossoming of the vines.

The current technique of storing prunes, after drying, takes place under isothermal conditions and away from light, but there is no control of the humidity and the atmospheric pressure. Yet the latter factor is a key factor in any enzymatic action, and prunes do experience enzymatic reactions after drying, during their storage, especially between February and April.

These reactions are obviously linked with the kinds of processing the prunes undergo during drying by traditional methods.

During this processing, one could observe the rapid evaporation of the water fraction during the first stages of "cooking". The surface areas of the prunes heat up the fastest because of the disappearance of the surface layer of vegetable wax covering the plums. Then a process of concentration of the sugary medium takes place.

Then, in a second stage, the heat produces a dilation of the epidermal pores, allowing the passage of substances of higher molecular weight, in the vapor phase.

At the end of the drying process, there is a thermal shock when the prunes pass from a temperature of about 70° C. to ambient temperature.

This thermal phenomenon has the effect that the vapor containing sugar substances is stopped at the surface. This vapor leaves a residue, and this deposit can be observed either by rinsing with distilled water and measuring the pH of the solution obtained, or by concentration and qualitative analysis.

One also observes an enzymatic degradation of the cellulose molecules of the epidermal membrane of the prunes.

This degradation is seen as a degradation of the sugars of high molecular weight due to the presence in the prune of vitamins $B_1$, $B_2$, and nicotinic acid or vitamin PP. These vitamins, which are water-soluble and preferential with respect to yeasts and, in addition, are thermolabile, cause the oxidation-reduction conversion of the sugars.

These two phenomena of thermal shock and enzymatic degradation result in loss of skin laxity in the prune and a change in color of the crystallized sugars on the surface due to the active transfer of tannins (anthracenic pigments).

It is an object of this invention to solve these problems in the current technique of cooking/dehydration of prunes by creating an artificial balance between the concentration of the sugars in the prune and the storage atmosphere, applying the principle of osmolality of media.

To achieve this, the invention provides a drying and/or preservation process for dried fruits or other fruits that are rich in sugar, especially the prune known as d'Agen. The process is characterized by, treating the fruit in an oven under conventional conditions of temperature, humidity and ventilation until the content of water in the fruit being treated reaches a predetermined limit; then, at the end of this stage, placing the fruit in its prevailing condition and temperature, in a sterile container, with the pieces of fruit being packed to keep the amount of air between them to a minimum; hermetically sealing these containers and holding them in an oven for 3 to 4 hours at a temperature of 75° to 80° C.; finally, removing the containers from the oven to be stored, hermetically sealed, at room temperature in a dry place until it is time for conditioning the fruit for shipment, packaging and sale.

Thus, the fundamental principle of this process is confinement, and this process makes the effect of the temperature less damaging.

When this process is used for drying prunes, the pieces of fruit are placed in sterile containers when the water content in the prunes has been reduced to about 40%, which corresponds to approximately two-thirds of the time for conventional processing.

In this way, during approximately the last third of th drying process, when the fruit is hermetically sealed in the containers, the sugary vapors are retained and a saturated atmosphere is obtained inside the containers.

The storage atmosphere is rarefied and the humidity is controlled.

Moreover, the heating causes a low pressure inside the containers, which reduces the enzymatic reactions.

The best containers would be cylindrical glass jars, which have the advantages of stopping ultra-violet rays, and of assuring a slow cooling of their contents, once out of the oven, and a relatively constant temperature as compared with the temperature variations of the surroundings, and a more homogeneous temperature inside the containers as well as the suppression of turbulence inside the oven due to the cylindrical shape of the containers.

The process of this invention, by halting at the outset the phenomenon of sugaring and others related to it, prevents any harm to the appearance, taste and preservation of the fruit. When eaten immediately after opening the preserving containers and without any other treatment or preparation, the fruit meets the standards set by law, notably as related to prunes (appearance, quality, color and water content).

Thus, this process eliminates all operations subsequent to traditional drying, that is to say, storage, washing and rehumidification.

This process is carried out using conventional methods, in particular, using the current continuous-drying tunnels.

The fruit to be dried, in particular the ente-variety plums used to make prunes, are placed in the usual way on screens placed on carriers, for the first two-thirds of the treating process. At the desired time, the heated fruit is packed, for example, in a cylindrical glass jars whose cold walls have been preheated.

The proper moment to fill the containers can be determined either by timing, by carrying it out at about two-thirds of the average time of traditional processing, at the end of which period it has been found that the prunes generally have a water content close to 40%, or by monitoring the changing water content of sample prunes.

Packing the fruit into the jar can be done by hand or mechanically, so that the fruit is as tightly packed as possible while still observing the criterion of appearance for fruit, notably those defined in the current legislative standards for prunes.

These jars are sealed by a cap or by a hermetic lid able to withstand the process of sterilization in a water bath, then put back into the oven on supports fitted to the screen-bearing carriers, these supports being constructed to facilitate the maximum air circulation around the jars.

Once out of the oven, the air-tightness of the jars is verified and they are simply transferred to a dry storage place where they can be kept for months. At any time, immediately after the opening of the jar in which it is preserved, the fruit can be tasted or conditioned by the usual techniques.

The heating of the hermetic containers lasts for about 3 to 4 hours, the precise heating time being determined by the desired final percentage of water in the prunes. It has been determined that after a heating period of about 3 hours, the prunes removed from the jars had a water content of 35%, while after 4 hours the content had decreased to 33.8%.

The process of this invention is especially applicable to the drying of prunes to avoid sugaring, while giving them a taste and texture superior to those of conventionally processed prunes; however, it can also be applied generally to any fruit with a natural or artificial high sugar content (candied fruit, glazed chestnuts, etc.) to avoid the phenomenon of sugaring either during the treatment of the fruit or during preservation.

I claim:

1. A process for drying and preserving a hygroscopic fruit to avoid sugaring consisting essentially of:
   (a) dehydrating said hygroscopic fruit at a temperature of 55° to 80° C. for a period of about 16 hours until the water content of the fruit is not more than 40% nor less than about 29%;
   (b) tightly packing the partially dehydrated fruit in its prevailing condition and temperature at the end of step (a) into sterile containers to minimize the amount of air present in said containers and, hermetically sealing said containers;
   (c) heating the confined partially dehydrated fruit in said hermetically sealed containers at a temperature of 75° to 80° C. for three to four hours to avoid thermal shock when heating is stopped and the product cooled to ambient temperature and subsequently storing said container at room temperature until time of use.

2. The process according to claim 1, wherein said containers are glass.

3. The process according to claim 2, wherein said glass container are cylindrical.

4. The process according to claim 1, wherein said fruit is rich in sugar.

5. The process according to claim 4, wherein said fruit is the d'Agen prune.

* * * * *